Nov. 24, 1925.  
W. H. WELCH  
1,563,311  
TOOL FOR MANIPULATING SPLIT TIRE RETAINING RIMS OF VEHICLE WHEELS  
Filed Feb. 13, 1925

Inventor  
W. H. Welch  
by Wilkinson & Giusta  
Attorneys.

Patented Nov. 24, 1925.

1,563,311

UNITED STATES PATENT OFFICE.

WALTER HENRY WELCH, OF BRISTOL, ENGLAND.

TOOL FOR MANIPULATING SPLIT TIRE-RETAINING RIMS OF VEHICLE WHEELS.

Application filed February 13, 1925. Serial No. 9,004.

*To all whom it may concern:*

Be it known that I, WALTER HENRY WELCH, a subject of the King of England, residing at Bishopston, Bristol, in the county of Gloucester, England, have invented certain new and useful Improvements in Tools for Manipulating Split Tire-Retaining Rims of Vehicle Wheels, of which the following is a specification.

This invention is for improvements in or relating to tools, hereinafter referred to as rim-tools, for manipulating split tire-retaining rims of vehicle wheels, and has for its object to provide an improved construction of the same whereby the removal and replacement of a tire on a rim are facilitated.

According to this invention, there is provided in a rim-tool, the combination with two rim-gripping devices adapted to be secured to the rim one on each side of the split therein, and each having a projection extending away from the plane of the rim, of two links which are pivotally engaged end-to-end with one another and are each rotatably engaged at its other end with one of said projections, and adjustable means for preventing relative rotation between the links in one direction.

According to another feature of this invention one of each of the links is provided with means for attaching an operating handle thereto to facilitate the manipulation of the rim-tool.

According to yet another feature of this invention the adjustable means aforesaid for preventing relative rotation of the two links in one direction is constituted by a screw-threaded pin engaging a screw-threaded hole in one of the links and having endwise engagement with the other link; this pin provides means whereby a small relative movement may be produced at will between the two links, for the purpose hereinafter set forth.

According to another feature of this invention, there is provided in a rim-tool, the combination with the parts set forth above, of resilient controlling means normally holding the links in the limiting position of their relative angular movement.

In the accompanying drawings which illustrate one embodiment of this invention—

Figure 1:
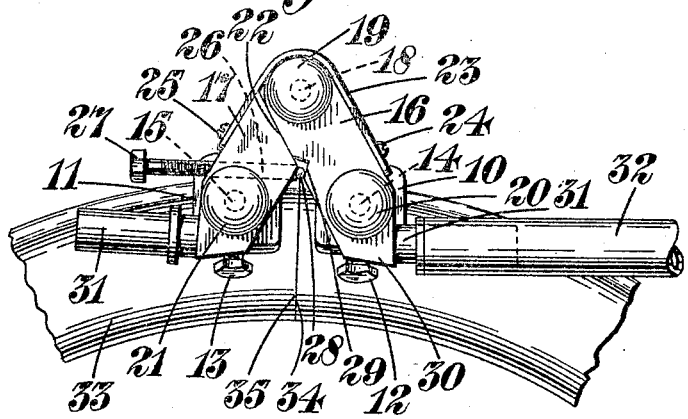
Figure 2:
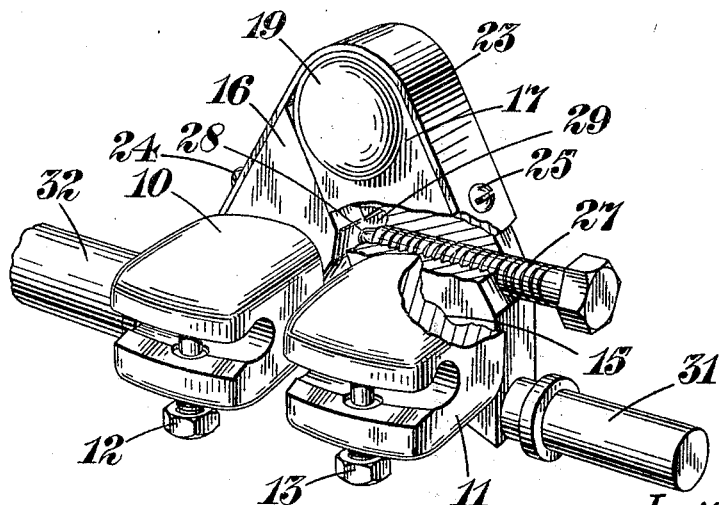

Figure 1 is a front elevation showing a rim-tool according to this invention as mounted on a split rim ready for use; and Figure 2 is a perspective view looking from the rear of Figure 1, with some parts broken away.

Like reference characters indicate like parts in both the figures.

Referring to these drawings, the rim-tool comprises two clamping devices indicated generally by the references 10, 11 respectively. Each of these clamps in cross-section is of a hook shape, as shown in Figure 2, and is provided with a set-screw 12, 13 respectively. The upper inner surface of the recess forming the hook, towards which the end of a set-screw moves as it is screwed in, is sloped towards the inner part of the recess so that when the edge of a rim is gripped between a set-screw and the said surface, tightening of the set-screw tends to wedge the clamp more securely on the edge of the rim.

The rear face in Figure 2 of each of the clamping-members 10, 11, that is to say, the faces of which parts are seen in Figure 1, are each made flat, and a round pin projects centrally from each of these faces as shown at 14, 15 respectively. Upon each of these pins there is pivotally mounted a link 16, 17 respectively, and the other ends of these links are connected together by a pivot-pin 18 which is formed with suitable heads 19 to retain the links thereon. Similar heads 20, 21 are formed on the pins 14, 15 respectively, for the same purpose.

In the construction shown, each of the links 16, 17 is cut away to substantially half its thickness where it overlaps the other link adjacent the pivot-pin 18, and abutting edges are thereby provided along the line 22 which prevent the links coming closer together, that is to say, enclosing a smaller angle than is shown in Figure 1. Obviously, the exact angle which is used may be varied within wide limits. The two links, however, may be opened apart, but a plate-spring 23 is mounted on them so as normally to hold them in their "closed" position. This spring extends around the ends of the links at the pivot-pin 18, and its ends are secured as by screws 24, 25 to the links 16, 17 respectively. The lateral engagement of the links with the flat faces of the clamping devices 10, 11, constrains the links so that they can move only in one plane; any relative movement of the two clamping devices is therefore restricted to movement in a plane which is parallel with the plane of the rim.

A hole is bored slantwise through the link 17 as shown at 26, and is screw-threaded to receive a screw-threaded pin 27 whereof the end 28 projects to engage with the other link 16. This link may be notched or recessed at 29 to provide a bearing surface for the pin 27 which is substantially normal to the length of the pin.

The links 16, 17 are each slightly extended beyond the pivot-pin 14, or 15, by which it engages a clamping device, as at 30, and a projecting pin 31 is secured thereon, this pin extending in a line substantially parallel with the line joining the centres of the pins 14, 15. Each of these extension-pieces 31 is adapted to receive an operating handle 32 which, in the construction illustrated, is of tubular formation and slips on to the extension 31.

In the operation of this rim-tool, assuming that it is desired to remove a tire from a rim, the two clamps 10, 11 are applied to the edge of the rim, one on each side of the split therein, and the set-screws 12, 13 are tightened up. In Figure 1, the two ends of a rim are indicated at 33, 34, and the split between them, where they butt together, at 35. If it is desired to separate the two ends of the rim, to break the joint, the pin 27 is screwed in by means of a spanner applied to its head. When its end 28 engages the notch 29 in the link 16, further rotation of the screw forces the two links apart, and the two clamps 10, 11 are thereby separated and they carry with them the ends 33, 34 of the rim.

When the desired amount of separation has been obtained, the handle 32 is swung downwards to the left in Figure 1. Assuming for simplicity that the pivot-pin 15 remains stationary in space, the pivot-pin 14 is thereby caused to move around it with a circular motion; the first part of the movement is downwards, and the latter part is towards the left. The end 34 of the rim thereby receives a similar movement relatively to the end 33, that is to say, it is moved radially inwards and then circumferentially inside the end 33, whereby the rim is contracted; the tire can then be readily removed. The relative movement of the pivot-pins 14, 15 is a circular movement of one pin about the other; whilst in fact movement may be imparted to both of them, the relative movement is unchanged, and the operation is as described above.

It will be appreciated that in the operation of contracting the rim, the force applied to the two links 16, 17 is such as would close them together but the screwed pin 27 constitutes an abutment preventing such closing movement, and if the pin has not been used, the abutting surfaces 22 fulfill the same function.

When replacing a tire on a rim, the rim will be contracted in the manner hereinbefore described, and after the tire is in position, the rim will be allowed to expand by reversing the movement of the operating handle 32. If the normal shape of the rim is with the ends butting together or substantially so, no great force will need to be applied to the operating handle. If, however, it is necessary to apply some force to it, the operating handle 32 is transferred to the other extension-pin 31, so that a reversal of the setting takes place and the direction of force for expanding the rim is such as tends to close together the links 16, 17. Also it will be appreciated that the tool can be used right-handedly or left-handedly, as may be convenient by putting the handle on one or other of the pins 31.

The invention is not limited to the specific construction hereinbefore described and illustrated, for various modifications may be made without departing from the scope of the invention. Thus, for example, instead of using the pin 27 as an adjustable abutment, a cam, wedge or other suitable device could be used instead. Also, instead of using the hook-shaped clamps 10, 11, to engage only one side of the rim, clamps of this form could be applied to both sides of the rim, or other forms of clamp gripping both sides of the rim could be used; in such cases two pairs of links 16, 17 could be used, one pair on either side of the rim, and two operating handles could be used, one on either side of the rim, or a single suitably-shaped operating handle could be used to engage and operate simultaneously the two sets of links.

What I claim as my invention and desire to secure by Letters Patent is:—

1. In a tool for manipulating split rims of vehicle wheels, the combination of two rim-gripping devices adapted to be secured to the rim, one on each side of the split therein, a projection on each of said devices extending away from the plane of the rim, two links pivotally engaged end to end with one another and at their other ends each rotatably engaged with one of said projections, and adjustable means preventing relative rotation between the links in one direction.

2. In a tool for manipulating split rims of vehicle wheels, the combination of two rim-gripping devices adapted to be secured to the rim one on each side of the split therein, a projection on each of said devices extending away from the plane of the rim, two links pivotally engaged end to end with one another, and at their other ends each rotatably engaged with one of said projections, guiding means restraining said links from movement other than in a plane parallel with the plane of the rim, adjustable means preventing rotation between the links in one direction, and means for attaching an operating handle to one of said links.

3. In a tool for manipulating split rims of vehicle wheels, the combination of two rim-gripping devices adapted to be secured to the rim one on each side of the split therein, a projection on each of said devices extending away from the plane of the rim, two links pivotally engaged end to end with one another and at their other ends each rotatably engaged with one of said projections, guiding means restraining said links from movement other than in a plane parallel with the plane of the rim, a screw-threaded pin engaging a screw-threaded hole in one link, and having endwise engagement with the other link, to cause relative movement between the links when adjusted, and means for attaching an operating handle to either of said links.

4. In a tool for manipulating split rims of vehicle wheels, the combination of two rim-gripping devices adapted to be secured to the rim, one on each side of the split therein, a projection on each of said devices extending away from the plane of the rim, two links pivotally engaged end to end with one another and at their other ends each rotatably engaged with one of said projections, adjustable means permitting relative rotation between the two links in one direction but preventing rotation in the other direction, and resilient controlling means normally holding said links in the limiting position of their relative angular movement.

5. In a tool for manipulating split rims of vehicle wheels, the combination of two rim-gripping devices adapted to be secured to the rim one on each side of the split therein, a projection on each of said devices extending away from the plane of the rim, means mounted on said projections and coupling said devices together, means for varying the relative positions of said clamping devices, and means for imparting movement to one clamping device to cause it to travel in a substantially circular path around the other in a plane parallel with that of the rim.

In testimony whereof I affix my signature.

WALTER HENRY WELCH.